March 6, 1956 G. MUFFLY 2,737,646

TRANSIENT VIEWER AND RECORDER

Filed June 12, 1952

INVENTOR.
GARY MUFFLY
BY
HIS ATTORNEY

United States Patent Office 2,737,646
Patented Mar. 6, 1956

2,737,646

TRANSIENT VIEWER AND RECORDER

Gary Muffly, Oakmont, Pa., assignor to Gulf Research & Development Company, Pittsburgh, Pa., a corporation of Delaware Application June 12, 1952, Serial No. 293,165
6 Claims. (Cl. 340—318)

This invention relates to recording and reproducing devices.

An object of the invention is to provide a novel device whereby a continuous sequence of data may be recorded at one speed, and may be reproduced substantially at the same time, but at another speed, without interference in any manner with the recording means.

Another object of the invention is to provide a novel device for substantially instantaneous observation and recording of non-recurring transient electrical phenomena on one face of a magnetic record, and for reproduction of the recording from another face of the record at about the same time, but at a preselected rate of speed, so that the reproducing portion of the device plays back the transient at a much higher repetitive rate, so that the transient may be viewed instantaneously and continuously on an oscilloscope with persistence of vision.

A further object of the invention is to provide a novel and improved recording and reproducing device of the magnetic-record type, employing a very thin paramagnetic recording disc, which is so thin that a recording head may be employed for continuously recording on one face of the thin disc, while a reproducing head may be revolved along the same track but on the other surface or face of the recording disc, the reproducing head turning at a convenient speed, just enough to give a good persistence of viewing, so that the reproducing head will continuously play back the recording at such rate, no matter how long a period the recording represents.

Still another object of the invention is to provide a novel and improved recorder and viewer for instantaneous observation and study of non-recurring transient electrical phenomenia, in which the construction is such that the reproducing head is permitted to feed back successive sequences of the original phenomena causing a reproduction on a cathode-ray oscilloscope of a succession of corresponding momentary images which may be observed as a persistent or enduring image of the said original momentary phenomenon.

Still a further object of the invention is to provide a novel and improved recorder and viewer of the type described, which is suitable for long recording periods, providing instantaneous viewing without loss of persistence of vision, being appropriate for recording periods lasting from one second to an hour or more, and which may be used for longer periods if desired, such as a day, or a week, as needed.

Another object of the invention is to provide a novel and improved recorder and viewer of the type described herein, which is simple in design, relatively inexpensive to manufacture, and which is highly effective and efficient for its intended purposes.

Another object of the invention is to provide a novel and improved recorder and viewer of the type described which may be used for recording and subsequent viewing of substantially simultaneously occurring phenomena, each of which is recorded separately but which may be viewed together and thereby compared.

The manner in which these and other objects and advantages of the invention are attained will become apparent from the following detailed description of a preferred embodiment thereof, as illustrated in the accompanying drawings, forming a part hereof, and in which.

Figures 1, 2, 3, 4:
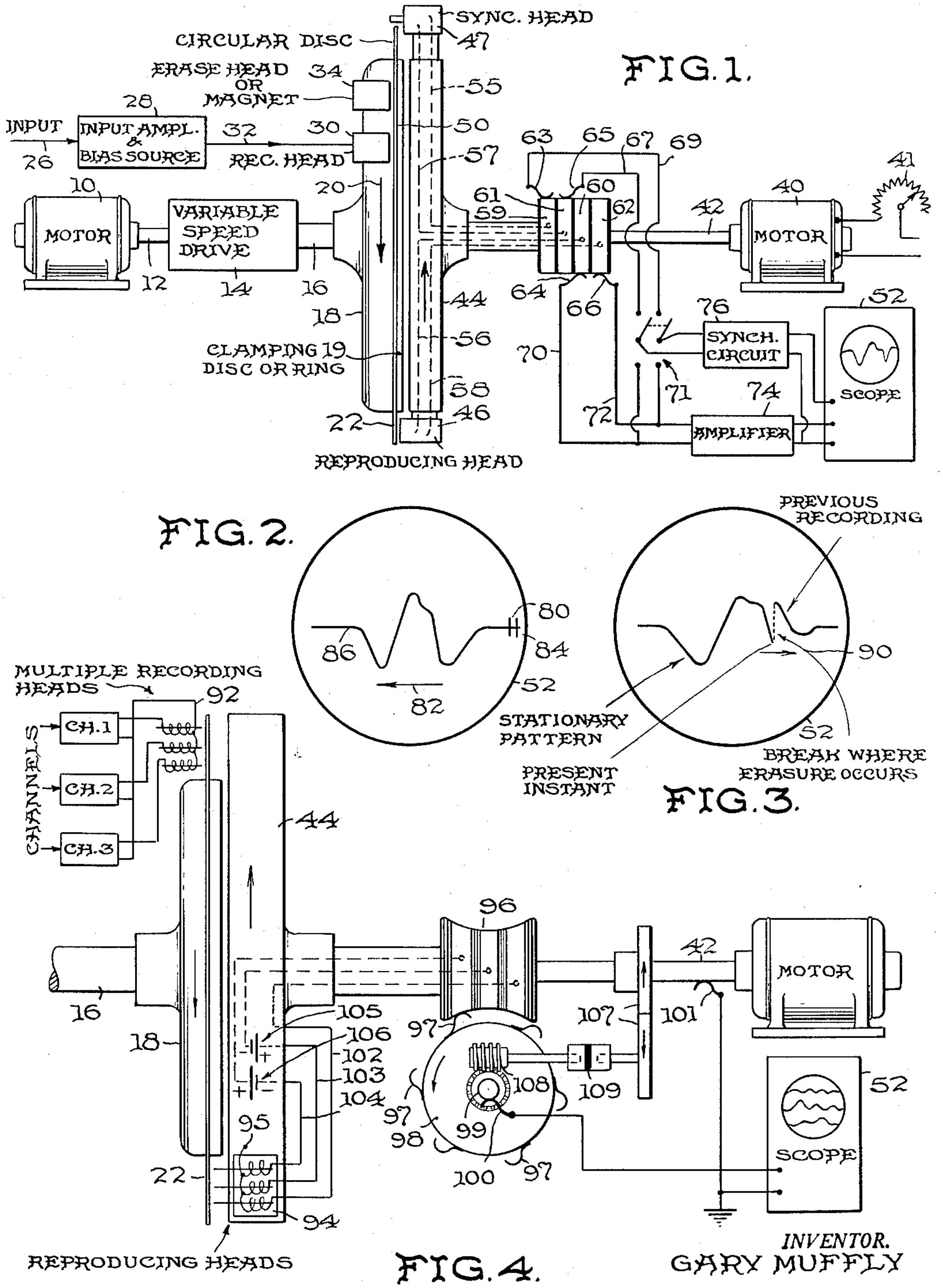
Figure 1 is a diagrammatic front-elevational view showing a rotatable magnetic disc and means for driving the same, with recording and erasing means, and reproducing means, circuit elements being indicated diagrammatically and schematically.
Figure 2 represents the reproduction of the recording as seen on the face of the oscilloscope, showing the conditions observed, constituting the transient under observation.
Figure 3 represents the reproduction of the recording as seen on the face of the oscilloscope, the arrangement being such as to make rapid transients stand still in effect, for quick visual analysis.
Figure 4 is a front elevational view showing an extension of Figure 1 by which the recording and viewing of several independently recorded phenomena may be accomplished.

The present invention, in one aspect of the inventive idea, fills a gap which exists between viewing a phenomenon on a cathode-ray oscilloscope and recording it on a pen-type recorder. An oscilloscope is not fully satisfactory without photography for any non-recurrent transient, because the pattern dies out before it can be fully studied. A conventional optically-recording galvanometric oscillograph is handicapped by the delay and expense of developing the photographic record. A pen-type recorder is satisfactory for slower transients, but may waste a great deal of record material in attempting to record a transient. Some forms of transient recorders are limited to a short recording period, and viewing is not only delayed, but is subject to considerable lack of persistence of vision.

The present invention includes a magnetic device which is suitable for long recording periods; and provides instantaneous viewing without loss of persistence of vision. It is appropriate for recording periods lasting from one second to an hour or more, and can be used for longer periods, such as a day, or a week, or longer, if desired.

It is often desired to view and simultaneously record transients that happen too slowly for persistence of view on a cathode-ray oscilloscope, but occur at random times, so that record consumption would be excessive on an ordinary recorder. This invention contemplates continuous recording on one side of a thin disc or cylinder of a magnetic-recording medium, in cycles of adequate period to handle the desired transients. At the end of the period, the oldest part of the record is erased by a head on the same side of the record. Meanwhile, a reproducing head on the other side of the record medium plays back the transient at a much higher repetitive rate, so that the transient may be viewed instantaneously and continuously on an oscilloscope with persistence of vision.

The sweep of the cathode-ray oscilloscope may be synchronized with the rate of repetitive playback, so that the screen simulates a portion of a conventional record that enters one side of the screen and disappears upon reaching the other side. When a transient is completed on the screen, the recording and erasing heads may be cut off to preserve the record. For faster transients, the sweep rate may be altered to make the waves stand still on the screen.

In order to understand clearly the nature of the invention, and the best man for carrying it out, reference may now be had to the drawings, in which like numerals denote similar parts throughout the several views.

As seen in Figure 1, there is a driving motor 10 energized from a suitable source of electrical energy, and having a drive shaft 12 engaging a variable speed drive 14, so that the output shaft 16 may be driven at any selected or desired rotational speed, suitable gear shifting or other well-known speed-varying means being employed for this purpose. A face plate 18 is carried concentrically on the right-hand end of the output shaft 16 as seen in Figure 1, and is keyed thereto for rotation therewith, in either direction desired, as for example, the direction indicated by the arrow 20, and has secured to the right face thereof, for rotation therewith, a thin disc member 22 which serves to carry the record medium. A disc or ring 19 on the right side of medium 22 is held to the plate 18 by screws or springs (not shown) and clamp the disc 22 against the face plate 18.

Although the member 22 is shown as a disc, it will be understood that I do not wish to be limited to use of a disc, and that other endless forms of recording medium may be employed, including a cylindrical record. The record member 22 may be formed of paramagnetic or magnetizable material, or may have a circular track carried thereon or therein, formed of such paramagnetic or magnetizable material, the track portion thereof being quite thin. The record member 22 may be driven at any desired rate of speed, by means of the output shaft 16, depending on the maximum duration of the event or phenomenon to be recorded.

For example, it might be set at five seconds, to record a voltage surge in a power line. At the completion of the five-second period, the magnetic track would, according to one form of the invention, complete one revolution. Events previously recorded, that is, five seconds earlier, would be replaced then. The record at any moment would cover only the preceding five seconds.

Thus the input signal or data brought into the circuit at 26, is suitably amplified in amplifier 28, for influencing and energizing a conventional recording head 30, being electrically connected therewith by means of connection 32. As the signal is fed to the magnetic air gap of the recording head 30, the result is to differentially magnetize the paramagnetic sound track in the circular disc 22 in well-known manner, making a record of the signal or data received from the input source 26.

An erase head or magnet is shown at 34, being oriented so as to traverse the track on the rotating magnetic record disc 22, to erase or obliterate the recorded track signal at the predetermined time. The erase head 34 can be of either the high-frequency type or permanent-magnet type. A suitable circuit, not shown, may be provided to respond to its induced voltage in the playback head and permitting it to be used to actuate the usual sweep-synchronizing circuit of the cathode-ray oscilloscope, for certain purposes of the present invention mentioned hereinbelow.

The magnetic disc or record 22 thus rotates about the axis of the shaft 16 at a speed which is predetermined in accord with the situation at hand. As seen in Figure 1, a motor 40 has a rotating shaft 42 carrying a flywheel 44 for rotation therewith, and there is a reproducing or playback head 46 which is carried on the periphery of the wheel 44, rotating in unison with the shaft 42. It is apparent that the playback head 46 would be revolved along the same annular track 22 but on the other surface 50 of the magnetic material forming the track, so that the reproducing head 46 could run at a different speed without mechanically interfering with the recording head 30. A convenient speed would be about ten to twenty-five revolutions per second, just enough to give a good persistence of viewing on the oscilloscope 52. Thus, the reproducing head 46 would continuously play back the recording of a signal or transient phenomenon at a standard convenient rate, no matter how long a period the recording on record 22 represents. A rheostat 41 or other conventional means may be used to adjust the speed of motor 40 to a desired value.

As the playback head 46 scans the record 22, it must follow the same track as the recording and erasing heads 30 and 34 respectively, and so must pass them at regular intervals. This is why it is necessary, according to the invention, for the heads 30 and 34 to use one side or face of the magnetic record 22, and for the head 46 to use the other side or face 50 of the record.

Preferably, the record 22 would be of a solid magnetic material or metal which is any suitable thickness, very thin in fact, so that the recording head magnetizes the metal of the record 22 clear through its thickness sufficiently to respond effectively at the reproducing head 46 on the opposite surface 50. The low relative velocity of the recording head 30 along the record 22, would allow it to contact the record directly, or almost come into direct contact therewith, but the playback head 46 would preferably be spaced a small or minute distance from the record surface 50, to prevent excessive frictional wear. This, of course, lengths the minimum wavelength that can be utilized efficiently, but a great deal of information can still be recorded in one revolution of the disc 22. To get a definition equivalent to that of a television picture, it is only necessary to be able to record about 300 wavelengths in one scanning cycle. By way of example, if it is assumed that the head spacing and record thickness are such that the minimum usable wavelength is increased from the usual one mil or so, to about forty mils, it is still possible to get 300 wavelengths in twelve inches of track circumference, and the track circle would still be only about four inches in diameter.

In following the track 50, the playback head 46 must pass the erase head 34 and the recording head 30 at short intervals. At the moments of passing, the fields of these heads will be picked up by the playback head 46. One of these signals may be used to synchronize the sweep of a cathode ray oscilloscope 52 to the scanning rate. As seen in Figure 1, the playback head 46 has a coil which is connected by lead wires 56 and 58 to slip rings 60 and 62 which are rotatable with shaft 42. Brushes 64 and 66 make contact with the perimeters of the rotating slip rings, to carry the playback signal through leads 70 and 72, to amplifier 74, and to actuate oscilloscope 52 to reproduce the signal visually, as seen in Figures 2 and 3 to be described.

A second reproducing head 47 is mounted on the wheel 44 and may be used for synchronizing the oscilloscope sweep to the relative speeds of the recording head 30 and the record 22 when such synchronization is desired. The synchronizing head 47 may operate on the periphery of the record disc 22 outside the main recording track, a pip or pulse having been recorded on the periphery of the record disc 22 for this purpose. The coil of the synchronizing head is connected by wires 55 and 57 to slip rings 59 and 61 whence the signal is taken off by brushes 63 and 65 and transmitted over wires 67 and 69 to one side of double-pole-double-throw switch 71. The other side of switch 71 is connected to wires 70 and 72 as shown in Fig. 1, while the switch arms are connected to synchronizing circuit 76.

As mentioned above, the rotation of the playback head 46 causes it to pass the erase head 34 and the recording head 30 at short intervals. At the moments of passing, the fields of these heads will be picked up by the playback head. One of these signals may be used to synchronize the sweep of the cathode-ray oscilloscope 52 to the repetitive reproducing rate. The erase head 34 is the logical one to use for this purpose, since it can have the strongest signal and the most constant signal.

The erase head may be of either the high-frequency type or may be of the permanent magnet type, a suitable circuit being provided to respond to voltage induced from it and use this signal to actuate the usual sweep-synchronizing circuit of the cathode-ray oscilloscope 52. If this arrangement is used, the point on the oscilloscope sweep corresponding to the present instant will be near one end of the sweep and will remain stationary, but the event on the record will move or drift in a direction away from the current-instant point 80 seen in Figure 2. For this type of operation the switch 71 is thrown into the down position.

Thus, if the directions of rotation are as in Figure 1 and if the oscilloscope sweeps from left to right, the pattern will drift as seen in Figure 2, as shown by arrow 82. In the pattern of Figure 2, the points 80 (current instant) and 84 (erasure) show signals that result when the playback head 46 passes the recording and erasing heads 30 and 34. As soon as the latter signal actuates the sweep return through the synchronizing circuit 76, the trace ends and the spot returns to the left, as seen in Figure 2, for another scanning cycle. The start of the transient is shown at 86 in Figure 2, the transient being shown on the curve as illustrated thereafter, from one side to the other, of the screen.

As far as the observer is concerned, Figure 2 is equivalent to a strip chart coming into the field of view from the right, passing the recording stylus at the current-instant point 80, and moving across the field of view, thus disappearing at the left end of the sweep. Normally, the record is erased and re-used automatically, but if the observer sees a particularly-interesting event in the field of view, he can stop the recording and erasing functions so as to permanently retain the event on the record disc 22, and study the event in detail or remove the record from the machine for later study, replacing the removed record with another one.

In some cases where rapid transients are to be observed, it may be easier to view them if they are made to stand still instead of allowing them to drift across the screen. For example, assume the recording period to be only a half a second, in which case the waves will move so rapidly that one may see a multiple-image effect unless the playback cycle is very rapid. To avoid this, the oscilloscope sweep may be adjusted to equal the period required for the scanning or playback head 46 to move one whole revolution relative to the record disc rather than relative to the erasing head 34. The switch 71 is thrown into the upward position so that the synchronization of the oscilloscope sweep is effected from synchronizing head 47. Figure 3 then applies. The recorded trace is broken into two parts by this method, at the broken line portion 90 where the erasure occurs, and the advantage is that the exhibited waves seem to stand still for quick visual analysis.

The present invention utilizes any well-known laboratory oscilloscope circuits and a very simple mechanism, as mentioned herein. Since the playback speed is preferably comparatively high, conventional magnetic recording techniques are satisfactory.

The device shown herein may also be used with multiple tracks or channels. For viewing on a single oscilloscope, the scanning rate may be stepped up in proportion to the number of channels to be scanned. Channel-switching means may be provided so that all traces can be viewed simultaneously, the traces for the various channels being displaced vertically by injecting various direct-current voltages into the switched channels.

Figure 4 shows how the invention may be employed with multiple channels. The recording and reproducing heads are multiple as indicated diagrammatically at 92 and 94, respectively. Each individual recording head produces a separate track on the recording medium 22 and the corresponding reproducing heads are aligned to these tracks. A single erasing head, not shown, may be used to span all of the tracks. An extra reproducing head (not shown) may be provided for obtaining synchronization signals similar to synchronizing head 47 of Figure 1, this part of the apparatus being omitted from Figure 4 in order to simplify the drawing. The respective members ofthe heads 92 and 94 may be arranged in a radial line as shown, or may be staggered around the axis of rotation provided only that the respective recording and reproducing members are in the same relative arrangement for each channel so that there will be no phase shift of one channel with respect to any other channel. One side of the coil of each reproducing head is grounded as at 95, and the other side of each coil is connected respectively to a slip ring on the commutator shown generally at 96 by ways of connecting wires 102, 103, 104. By means of the connection-shifting arrangement shown, the channels are presented in turn to the oscilloscope at a rate sufficiently fast for visual persistence. The base lines of the individual channels are vertically separated on the oscilloscope as will be explained.

The commutator 96 rotates with the shaft 42 while brushes 97 traverse the face of the commutator from ring to ring. The brush holder 98 is geared to the shaft 42 as by gears 107 and 108 in such a manner, that for each complete revolution of the wheel 44 one of the brushes advances one slip-ring interval. The slip rings are so dimensioned in width that the brush slips from one ring to the next at the end of each cycle or rotation of wheel 44. The brushes 97 are so spaced that when a brush leaves the last slip ring on the left-hand end of the commutator, the next brush contacts the first slip ring on the right-hand end of the commutator. By way of example, Figure 4 shows three channels connected to three slip rings on commutator 96, and six brushes, each of which leads to the oscilloscope, so that the brush holder 98 must rotate once for every 18 turns of the shaft 42. The brushes 97 are connected through the brush holder 98 to slip ring 99 on the brush-holder shaft, and slip ring 99 is in turn contacted by brush 100. An insulating coupling may be inserted as at 109 to isolate the brush holder 98 from the motor shaft 42, or this isolation may be accomplished by using non-metallic gears 107 or other means. Another brush 101 connects to the shaft 42, thus completing the circuit (through connection 95) to the respective reproducing heads. Brushes 100 and 101 connect to the oscilloscope, and if necessary or desirable, an amplifier such as 74 of Figure 1 may be interposed at the input to the oscilloscope. Synchronization is provided as by elements 47 and 76 of Figure 1.

To separate the channels on the screen of the oscilloscope each channel signal may be superimposed on a different D.-C. bias voltage. By way of illustration, one way of doing this is to insert small dry cells in the respective leads 102, 103, 104 from the reproducing elements 94. In Figure 4 one channel connected through wire 102 has no such cell, and the other channels 103 and 104 have cells 105 and 106, respectively, each of opposite polarity. Thus, in Figure 4, the channel 103 may operate at minus 1 volt, channel 102 at zero potential, and channel 104 at plus 1 volt. The D.-C. levels must be proportioned in accordance with A.-C. levels produced by the reproducing heads, so as to maintain horizontal base lines and produce adequate vertical displacement of the respective traces on the oscilloscope 52. It is apparent also that the oscilloscope and any amplifier used must have a good D.-C. or very low frequency response.

By means of the apparatus of Figure 4 sequential representations of the channel signals are obtained, each representation being similar to Figure 3 previously described. The rate of switching must be fast enough so that each channel is presented on the oscilloscope with adequate persistence of vision.

A device according to the invention is quite versatile, finding application in many fields, such as depth recorders on ships, industrial process recorders, barographs, seismographs, general laboratory use, and many other requirements.

While I have illustrated my invention with the recording head stationary and a moving record medium and a moving reproducing head, it is apparent that the record medium may be stationary and a moving recording head arranged to traverse the record medium as well as having a moving reproducing head traverse the record medium. Furthermore, although I prefer to operate the recording and reproducing heads on oppostie sides of a thin record medium, it is also possible to run them on the same side of the record medium, provision being made so that the reproducing head can pass the other heads without mechanical interference while still running close enough to the magnetic record track to operate from the field of the recorded track.

Although I have described my invention in specific terms, it will be understood that various changes may be made in size, shape, materials and arrangement without departing from the spirit and scope of the invention as claimed.

What I claim is:

1. Means for recording a phenomenon at a relatively slow rate and simultaneously repetitively reproducing it at a rate adequate for maintaining persistence of vision comprising an endless record medium, means for driving said recording medium in a closed circuit, a recording head magnetically engaging said record medium, means for recording signals on said record medium at a predetermined rate with said recording head, means for erasing said recorded signal substantially at the end of said recording circuit and a separate reproducing head arranged to repeatedly scan said record medium including the portion on which recording is taking place at a second rate greater than twice said predetermined rate and at a repetitive rate high enough to reproduce the record with persistence of vision.

2. Means for recording a phenomenon at a relatively slow rate and simultaneously repetitively reproducing it at a rate adequate for maintaining persistence of vision comprising an endless record medium, means for driving said recording medium in a closed circuit, a recording head magnetically engaging said record medium, means for recording signals on said record medium at a predetermined rate with said recording head, means for erasing said recorded signal substantially at the end of said recording circuit, and a separate reproducing head arranged to repeatedly scan said record medium including the portion on which recording is taking place at a second rate greater than twice said predetermined rate and at a repetitive rate high enough to reproduce the record with persistence of vision, said separate reproducing head being arranged to traverse said record medium along a path adjacent to the path of the recording medium and slightly spaced therefrom so that the reproducing head may pass the recording head without mechanical interference between them.

3. A transient viewer and recorder comprising an endless erasable recording medium, recording and erasing heads arranged to cyclically traverse a path to produce a record track on said medium while continuously recording at the beginning of a cycle and continuously erasing near the end of the cycle, a reproducing head arranged to cyclically traverse an adjacent mechanically-independent path closely paralleling the path of said recording head at the recording location and within the influence of said record track and said track recording head at a cyclical rate substantially greater than twice the recording rate, whereby each reproduction cycle repeats a majority of the signal reproduced in the preceding reproduction cycle even though recording is continued simultaneously with reproduction.

4. Means for recording a relatively slowly-changing phenomenon and reproducing it repetitively at a much faster rate comprising an endless magnetic record medium, a recording head actuated by the phenomenon and magnetically engaging the record medium, means to impart a continuous relative motion between said medium and said head so that an endlessly recorded reentrant track is produced on said medium at a predetermined recording speed, means magnetically engaging said medium to erase the recorded track continuously at a point where its circuit back to the recording head is substantially completed, a separate reproducing head magnetically engaging the medium and arranged to repeatedly scan said track including its last-recorded portion and the field of the recording head continuously at a speed greater than twice the recording speed, whereby a phenomenon including its most recent portion occurring during the circuit of the track may be viewed oscilloscopically.

5. Means for recording a relatively slowly-changing phenomenon and reproducing it repetitively at a much faster rate comprising a magnetic record medium, a recording head actuated by the phenomenon and magnetically engaging the record medium, means to impart a continuous relative motion between said medium and said recording head so that a record track is produced on said medium at a predetermined recording speed, a separate reproducing head magnetically engaging the record medium and adapted to pass the recording head to reproduce the most recently recorded part of the record track, and means to impart a relative motion between said reproducing head and said record medium greater than twice the recording speed and to scan said record at a repetitive rate adequate to sustain persistence of vision whereby the phenomenon including its most recent part may be viewed oscilloscopically with persistence of vision.

6. Apparatus for observing during its occurrence a relatively slowly-changing phenomenon which comprises a magnetic recording head actuated in proportion to said phenomenon, a magnetizable record medium, means for moving said record medium past said recording head at a first relatively low speed whereby a magnetic recording is made, means for scanning with a magnetic reproducing head that portion of the recorded record medium immediately leaving the recording head at a second relatively high speed, an oscilloscope connected to said reproducing head and whose indicator deflection is in proportion to the output of said reproducing head and whose sweep is triggered by passage of said reproducing head past said recording head, and means for repeating said scanning at intervals less than the time persistence of human vision.

References Cited in the file of this patent

UNITED STATES PATENTS

| | | |
|---|---|---|
| 1,632,099 | Schelleng | June 14, 1927 |
| 1,941,618 | Nemirovsky | Jan. 2, 1934 |
| 2,105,016 | Smith | Jan. 11, 1938 |
| 2,378,383 | Arndt, Jr. | June 19, 1945 |
| 2,597,001 | Jaffe | May 20, 1952 |
| 2,690,473 | Cooley | Sept. 28, 1954 |

FOREIGN PATENTS

| | | |
|---|---|---|
| 986,473 | France | Mar. 28, 1951 |